(12) United States Patent
Willard

(10) Patent No.: X9816
(45) Date of Patent: Jun. 30, 1836

(54) SAW MILLS

(76) Inventor: Simon Willard

Simon Willard, of New-York.
Letters Patent

The Schedule referred to in these Letters Patent, and making a part
of the same, containing a description in the words of the said Simon
Willard himself, of his improvement in the Portable Iron Gang Saw
mill.

To all to whom these presents shall come: Be it known that
I Simon Willard of the City and State of New York have invented or
discovered a new and useful improvement in the construction of a portable
Iron Gang Saw-mill; or that I have invented several new and useful
improvements in Saw mill machinery, by which the sawmill is easily
convertable from the Gang mill to a Single Sawmill, & from the Single mill
to a gang with any required number of saws; and adjustable with great
accuracy and despatch, and by which improvements the Saw-mill is also
rendered portable in regular parts, or whole when made small by means of
the several improved forms of Iron newly applied to this purpose, which
being bolted together make and constitute the entire Saw-mill with more
accuracy, compactness, firmness, durability & despatch than was known before.
And when a pair of these mills are constructed for opperation in the same
building, they are calculated that with sufficient power to drive one at
a time, while the log is being prepared upon the carriage of the other mill
is all that is wanted for the use of both mills, by sawing an entire log one
way at once, passing through one gang and then sawing it the other way by
passing it through the other gang to which the motive power is readily shifted
for that purpose, and while the former mill is stopped to remove the sawed
Timber, and to fix another log upon the carriage thus by driving first one mill
and then the other by the same propelling power, will be a saving of expense
in the engine and fuel ordinarily used. And that this specification con-
taining a full and clear description of the construction, mode of opperation
and advantages of this Iron Gang Saw Mill, also includes for a more clear
understanding of the said improvements, certain motions and parts of the
Saw Mill heretofore known, but which I have designated so that my claim as inventor of the improved and newly applied parts are clearly distinguish-
able from them. That by the construction and conformation of the improved
parts in connexion with the parts of the saw mill heretofore in use.
It is made and constructed a new and useful portable Iron Gang Saw
Mill. The several parts of this Saw mill consists of a newly construc-
ted Iron supporting frame, an improved pair of vibrating fender posts, an
improved driving crank shaft and ballance pulley, a newly applied pair
of pitmans, an improved iron Saw gate & index improved. Saw stirrups,
and saw bolts, several pair of improved head bolts and mill dogs, a
pair of improved log beares, and an improved feeding apparatus
which are hereinafter distinctly set forth. The newly constructed Iron
supporting frame is composed of a pair of strong upright cast iron side frames,
or flanged plates about twelve feet in length, connected across their centre
with equally strong horizontal flanged parts about half their length, which
together with the upright side plates, and other necessary strengthening flanges
and boxes required to support the journals of the opperative machinery are
respectively connected in each of the same entire castings whose shape the
drawings further shew; but which are varied according to the situation of
mill sites and manner of applying the driving power. These two upright
cast Iron side frames are firmly fastened in an upright position about
four feet apart by means of bolts and cross bars reaching from one to the other,
and by means of the horizontal parts being rested and strongly bolted upon
the inner ends of a pair of large parallel carriage sills of any required
length, which are also securely fastened transversely to a sufficiency of base-
ment sills, whose extremities rest upon a pair of strong side walls, of stone or
timber while their middle support may depend upon posts beneath the
sawing floor of the mill, and which mills are altogether sheltered by any
suitable enclosure. When these Saw mills are required to be of sufficiently
small construction for the purpose of being the more easily moved, while for
sawing logs for fencing and for other purposes, the carriage sills for sawing
short timber are bolted fast upon a short basement frame which is sus-
tained upon rollers while drawn by sufficient Teams, or otherwise from one
place to another for the purpose of being continued the more conviently to the timber of the forest. When these gang saw mills are erected where the situ
ation of the driving power may require the driving crank shaft to revolve
above the saw gate, the cast iron supporting frame is formed with braces and
otherwise shaped as may be required to sustain the opperation of the
machinery above the mill or the vibrating fender posts may be omitted to
avoid the amount of their cost in sawing small stuff, in which case the
upper part of the cast iron side frames are broad & tapering upwards with
a pair of upright central flanges, constructed so as to constitute stationary
fender posts to which the upright slides are fastened and adjusted by screws
calculated for the jaws of the saw gate to vibrate upon. And that my
right as inventor of the improvement of this supporting frame, which I
hereby claim, consists in the application of iron in the newly improved
form herein before described and constructed of iron as the most advanta-
geous material to admit of the required form being applicable as it is
hereby applied to the purpose of constructing the gang saw mills from
patterns with greater despatch, and of sustaining in a superior degree the
opperation of the saw mill, with more accuracy, compactness, firmness, and
durability than was known before, to be so advantageously calculated
for accuracy and despatch in building the saw mill frames, as well as the
other parts, from patterns, and for avoiding the great cost, delay, and incon-
venience of erecting high, heavy and expensive timber mill buildings suit-
ed only to particular locations. The improved vibrating fender posts, con-
sists of a strong pair of upright cast iron plates, nearly the length of the
supporting frame, about ten inches broad in the centre with an upright
flange about five inches wide, cast at right angles to the inside of each
plate. These fender posts are strongly fastened parallel to each other about
three and a half feet apart by means of cross bars reaching from one to
the other, to which each of them are firmly adjusted by screws or otherwise,
and suspended by a pair of hooks and boxes fixed within their upper ends
to vibrate upon a horizontal shaft whose extremities are made fast &
supported on the upper end of the supporting frame, while their opposite
or lower ends are forced to vibrate about two inches back and forth by
means of a pair of suitable cams cast or fastened on the crank shaft next to its main journal, which cams revolve within a pair of cam yokes fastened to the lower end of the fender posts - or they are fastened to the upper end when the driving power is applied above, so as to be opposite to the axis, upon which they vibrate. The upright flanges of these fender posts projecting towards each other, constitute the vertical slides upon which the adjusted jaws of the saw gate slide up & down when the mill is in operation, or other slides are bolted to them for that purpose. The object of the vibration of these fender posts, as just described, for which I claim my right as inventor, consists in the advantage of saving power by withdrawing the saws when rising, clear of the uncut timber & saw dust.

The improved driving crank shaft is a strong horizontal iron shaft about five inches in diameter four feet long more or less with a crank in each end ten or twelve inches in length more or less, with a round wrist on each revolving within the boxes of a pair of pitmans, the journals of this crank shaft are next to the cranks and adjusted to revolve within a pair of strong boxes, cast or firmly adjusted in the lower end of the supporting frame, a large square shub supporter is cast upon the crank shaft - upon which the balance pulley is fastened, a nest of assized pullies are also fastened or cast upon the crank shaft around which a running band is forced to drive the feeding apparatus. The cams fitted to revolve within their respective cam yokes are also cast upon the crank shaft, by which the fender posts are forced to vibrate at every vibration of the vertical saws. The improved balance pulley, four and a half feet in diameter more or less, is a broad rim cast iron wheel, weighing about one thousand pounds, whose eye of the hub being sufficiently large is passed over the crank, and keyed fast to the hub supporter, and which is forced to revolve between one & two hundred times per minute by means of a broad flat band, in width equal to its rim being about eighteen inches, upon which it runs connecting with it the motion of the power drum of any sufficient power by which this saw mill is forced into opperation. a weight is cast or bolted upon that side of the balance pulley which is opposite to the crank, sufficient to balance the saw gate and other appendages vibrating by their connection with the motion of the pitmans - The newly applied pair of pitmans are about ten feet long with both ends similar & similar to the crank ends of the common
kind. The improvement of which consists in the application of an ad-
ditional pitman and new place of the opperation of both in relation to
their connexion with this iron gang saw mill, or iron saw gate. Their
lower ends being fitted to turn upon the wrists of the driving crank
shaft while their upper ends vibrate upon similar wrists which project
from each outside edge of the upper end of the iron saw gate; except
when the driving shaft is fitted to revolve above the saw gate in order
for accommodating the mill to the situation of the mill site, the lower end
of the pitmans then vibrate upon wrists projecting from the lower outside
corners of the iron gang saw gates or when the situation of the mill sites
in relation to the driving power whether by steam, water, wind or animal
power is applied to the driving crank shaft by flat or round rope or chain
band or by cog wheels or by water buckets or friction wheels or otherwise by
which this iron gang saw mill is forced to opperate require the pitmans
to be fitted to vibrate upon a pair of wrists projecting from the corners of
that end of the iron saw gate which is next to the driving shaft whether
it be placed to revolve above or below the saw gate in order to avoid
the burthen of two great a length of pitmans. The advantage of these
two pitmans as applied to this iron saw gate consists in sawing with
more or less saws on either one side or the other as occasion may require
by which it is convertible from a gang mill to a single saw or double
slabber, or from a single mill to a gang & by which the saw gate admits of
being made narrower, therefore stronger and lighter when made of cast
iron and saw a log equally large and slabbing both sides at once by
running between two saws, or two sets of slabbing saws and by a pair of
pitmans being connected by wrists to the corners of the saw gate opposite
to the end nearest the driving shaft, almost any place is a suitable
location for a low steam saw mill to give sufficient length of pitmans,
without the high mill floors attended with great expenses in providing
for the elevation of the saw logs too far above the earths level to which
the common single pitman saw mills are often necessarily subjected.
I hereby claim that my right of the improvement as inventor of this newly applied pair of pitmans, consists in the application of them to
the wrists of the iron saw gate of this iron gang saw mill, for the
purpose of the advantages herein just set forth. The improved iron
saw gate is a strong cast iron four sided frame or plate of an oblong
square from seven feet in length by about four wide outside & five
feet in length by about three & a half in width inside whose sides &
broad ends, being embraced in the entire casting are shaped by aid of
flanges cast at right angles to the face so as to give the requisite strength
with as little metal as possible upon a pair of round wrists projecting from
the outside edges of one end. This saw gate is adjusted with four jaw seats
and jaws upon its four corners by screws to vibrate between slides of the
fender posts in a vertical manner by means of the moving pitmans upon
the wrists by force of the revolving crank shaft. The upper & lower broad
ends of the saw gate being about a foot in width are strengthened with
curved flanges & also with two pair of straight saw flanges, cast upon their
inner edges sustaining the stirrups by which the saws are strained
against them, or the sides may consist of round or flat wrought iron
bars. The saw index consist of quarter notches or indentations of half an
inch apart more or less, or small as they will admit and support at
a certain distance apart from each other the hooks of the lower stirrups
& points of the screws of the upper stirrups at any place required for hang-
ing the saws parallel to each other. The index notches, indentations or
points are made along the upper side of the upper pair of saw flanges
& the lower side of the lower pair of saw flanges or along an iron index
or steel bars made fast to the saw gate flanges for that purpose.
My right of the improvement of this sawgate, which I claim as inventor
consists in the saw flanges and indexes against which by means of the
saw stirrups, the saws are adjusted & strained within the sawgate with
greater accuracy & despatch and by advantage of its being forged of iron
for that purpose and for the purpose of being more firm and durable
and being sooner made and to saw with more accuracy & solidity than
wooden saw mill gates & by its curved flanges for giving it strength and
application to this purpose as herein before described and set forth.

The improved saw stirrups consists of one pair for straining each saw.
The upper one being a screw stirrup and the lower a hooked stirrup. these
stirrups are made of strong cast or wrought iron whose outside is about
six by seven inches square with their interior openings about three by four
inches square & about one inch and three eighths thick with opening between
the screws and the hooks of the stirrups about three fourths of an inch
wide, or just wide enough to admit the thickness of the broad ends of the
saw gate and to slide along upon the saw flanges, also another nicely
adjusted narrow opening is made just wide enough to admit the thickness
of the saw & saw bolt so that when each saw is strained it is directed in
the course it is to saw, for the purpose of dispensing with the wedges ordinarily
used in adjusting saw mill saws. a pair of strong three quarter upright
screws pass through the upper parts of the screw stirrups with a square end
to each by which they are turned by a socket wrench on each side of the
saw gate above the flanges and pressing there nicely rounded steel points
upon the index above while the hooks of the lower stirrup presses up against
the lower index by which the saws are strained within the saw gate as
required for use. The drawing and references further explain the form
of these stirrups. I hereby claim my right as inventor of these new and
useful saw stirrups as constructed and applied to this purpose herein set
forth, being of superior advantage in adjusting and straining any one or
more or all the saws along the index of the saw gate flanges with great
accuracy and despatch. The improved saw-bolts are of an ell form as the
drawings shew about three fourths of an inch in diameter, and the same
in length & one or more are riveted fast in each end of the saw with
the elbow or other parts extending back to reach against the inside back
part of the stirrup by which the saws are hung over as required.
The advantage of these right angled bolts is in their form and appli-
cation to this iron gang saw mill, so that the saws can be taken out
and put in without taking the bolts out of the saws, by which the saws
are adjusted with despatch. The improved head blocks consisting of two
pair of different construction calculated for holding fast the mill dogs
by which the logs or large timber are securely held while sawing into various small dimensions. These head blocks are about two feet in width with
length sufficient to extend horizontally across the carriage to which they
are fastened when required. One pair is calculated for the mill dogs to
be forced by screws into the round log so as to hold each intended small
piece fast at each end while they are severally sawed from end to end
by a gang of any number of saws required to saw the entire log at once, the
outer parts into two slabs and more or less [illegible] plank & into a flat
shape or more or less flat parts ready to be sawed the other way into square
timber or square edged plank. This pair of head blocks consist of an
upper and lower cast iron flanged plate with half inch grooves cast
transversely across their insides within which the shanks of the mill dogs are
driven against their shoulders and held in by bolts passing through them
or otherwise. These saw mill dogs are half inch iron plates six or eight
inches wide by about two feet in length projecting between the saws about
half their length while the mill dogs of the screw head block are about
one foot in length the same thickness and nearly the same width.
The moving part of the screw head blocks consisting of the two plates
between which the short mill dogs are driven fast in grooves and is forced
about six inches more or less back & forth by means of a large pair of
horizontal screws which are turned within a pair of screw nuts fastened
on the outer back edge of another under horizontal cast iron flanged
plate bolted fast stationary upon the end of the carriage.
While the moving part of this stationary or screw head blocks is forced
forward by the large screws to drive the mill dogs into both ends of the
log it is kept down beneath a pair of horizontal slides adjusted at each
end of it above projections which extend from each outer lower corner.
Each end of these slides are secured fast upon the upper end of four
bolts which extend through the corners of the stationary part of this head
block & through the carriage to hold all fast together, while the saw head
blocks which is moveable along the carriage to suit the various lengths of
the logs is also bolted or made fast to secure the log at both ends while
sawing between the teeth of the mill dogs whose upper sides are flat &
may constitute the horizontal bearings upon which the timber is sustained.

while sawing. Another pair of these head blocks which are also calculated for supporting the log while sawing by this gang mill are both constructed for the purpose of sawing the timber previously flattened upon the other mill, while the ends of the log rest upon the ends of hard seasoned wooden bearings projecting forward & held from within square apertures or pigeon holes cast in them. They consist of two plates somewhat like those described in the first head blocks. cast with the partitions by which they are connected in the same casting together with a pair of upright flanges, with suitable holes made through them, through which horrizontal mill dogs are driven by the mill bar into the ends of the log by which it is held till sawed. These mill dogs are round with a sharp round hollow in the ends of sufficient size, or may be square. The other third pair of these head blocks being calculated to extend across the carriage and carry the log or timber to be sawed between two set of slabbing saws so that only one small slab & one, two or three [illegible] plank may be sawed off each side of the log at once running it through between the two sets of said saws for this purpose the cast iron part of this pair of head blocks are thick horrizontal plates about ten inches square & bolted stationarily upon the wood part of the head blocks. From two opposite edges of these plates a pair of uprights rise about five inches with dove tails for broad sliding mill dogs to slide in back & forth when driven in the end of the log by the mill bar. By this form of these head blocks the timber is fastened upon the carriage which may or may not be sufficiently narrow to pass with the log between the two sets of saws for the purpose of squaring round timber. For the purpose of moving the log along the head blocks in sawing this stuff with one or more saws. The horrizontal plate of these head blocks terminate at their front and back edge with a little more than a half round hollow projecting from their inner edge sufficient to keep them down while forced by rack and pinion to slide along a pair of rounded edge slides bolted upon the timbers of the head blocks below for that purpose, to which a rack is fixed or forced by a pinion fixed upon a transverse horrizontal shaft beneath to which an index or ratchet wheel is attached by which by crank or lever. The log is forced to move along the head block and become accurately adjusted by the index to any required thickness of boards, or other size timber. These square stationary plates are secured fast by bolts passing downwards through them and through thick pieces of plank extended with rebbited ends across upon the carriage and through similar pieces of plank which catch beneath the carriage or otherwise, these plates with the other uprights and round mill dogs may be bolted upon the timber head blocks of common form. The great advantages of the first and second described pair of these new and useful head blocks & mill dogs, in which I hereby claim my right as inventor of the same, consist in being formed of iron and of a new and useful form by which cast iron is appliable and hereby applied by me to the saw mill for the first time, for the purpose of holding fast the timber while it is divided into parts by a single saw or a gang of saws; and that whenever it may be required to save the cost of making both kinds, the horizontal plates described in the first pair of these head blocks may be cast connected by interior partitions as described in the second pair for forming the pigeon holes or appertures with grooves, above and below to hold the shanks of the notched mill dogs by which means the wooden bearings & both kinds of mill dogs can be used in the same cast iron head blocks and the upright flanges with the holes for mill dogs to be driven through into the logs sides, be also cast upon the uppermost edges. I do not claim in this specification any of the third described head block except its improved construction & new application and use in this iron gang saw mill, as herein before described. A pair of ratchet wrenches with which the screws of the same head blocks are both turned back & forth at one time by one person, consists each of a handle about twenty inches long, with a pair of right and left ratchet wheels rivited together within a ring of the large end of the handle & a pair of right & left hands rivited on each end of a rivit passing through the handle when they are used for this purpose, only one of each hand catches in the notches while the other is withheld in the hand of the opperator, the construction of these more fully appears in the drawings.

The log braces consists of horizontal rollers about eight inches in diameter, and in length not exceeding the inside width of the carriage, each of which revolve on a horizontal shaft fixed in the upper end of a pair of uprights rising from a horizontal plate with a socket in the under sides; all of these parts being connected in one entire casting. These log braces more or less are supported on the upper end of an upright broad flat timber driven fast within the socket of each casting which are raised and lowered to sustain the timber as required by means of windlasses each of which consists of a two inch round iron fastened beneath the floor &
crossings of the carriage with a three foot hand wheel on each by which the
timber is raised or lowered by a rope attached to the shaft and to the lower
end of the upright timber fastened in the socket of the dog beam.
The improved feeding apparatus consists of double worm feeding machinery cal-
culated for the purpose of advancing the carriage with the log in contact with
the moving saws, & when sawed through to be unshipped to run back the carriage
it is composed of the driving crank shaft, two setts of pullies, a pair of cone drums
two horizontal cone drum shafts, an upright worm shaft, two worms, two teethed
wheels, a carriage shaft & long rack & pinion. One of the sett of pullies is fixed
upon the driving crank shaft to drive by means of a running band the other
sett of pullies which is fixed directly opposite upon the upper cone drum shaft,
whose axis & the [illegible] of the lower cone drum are parallel and fitted to revolve
in boxes in the supporting frame. One of the worms is fixed on one end of the lower
cone drum shaft which runs in the teeth and drives the teethed wheel fixed on
the lower end of the upright worm shaft, whose worm of the upper end of it
runs in the teeth and drives the teethed wheel fixed on one end of the hori-
zontal carriage shaft, whose pinion acts in the cogs of the rack fixed on the
under side of the carriage by the opperation of which when the saw mill is in
motion, the carriage is advanced when sawing the log & run back by impulse
of a large grooved wheel also fixed on the end of the carriage shaft - when
the worm of the upright shaft is withdrawn from the teeth of the teethed
wheel for the same shaft by means of a chain running in the groove of the
large grooved wheel, & in the groove of the smaller grooved wheel or sheive [illegible]
revolving loosely upon the end of the horizontal worm shaft aside of another
larger pulley fastened to it upon which runs a continually running band con-
nected with the motion of the power drum, or another driving pulley which runs
back the carriage by tightening the chain bands, which is effected by a [illegible]
tightening pulley forced by a lever or otherwise fixed for that purpose —
For the purpose when sawing green timber for giving time for the offal wood of
the saw mill to dry sufficiently for the fuel required for driving the engine
a few spacious hand cars are required to run on rails around a circular
corner, so that the wood loaded upon them can be run out from the mill

United States Patent Patent No.: X9816 to remain several days under shelter & to dry without unloading except when wanted
under the boilers. This iron gang saw mill is put into opperation by any suita-
ble power in any manner that it may be appliable to the driving crank shaft
by band & power drum or by water or cogwheels by which wind, water, steam
or animal power may be applied with their suitable additional agents, by which
the pitman, connecting the revolving cranks with the vibrating saw gate of more
or less saws, the timber fastened upon the carriage while advanced by running
bands, connecting its motion with that of the driving crank shaft.
And for the purpose of using two of these gang mills by the advantage of steam
or other power only sufficient to drive one at a times is required on that account.
For this purpose a line of three shafts are constructed with four crank catches
one of each of their four inner ends with the middle shaft to which the driving
power is firstly applied having its journals sufficiently long to slide in its boxes
when forced back & forth by means of a forked lever for the crank catches
to catch in the crank catch of first one end & then the other of the two outer
shafts, whose drums are of suitable size to give the required motion, and
are directly opposite the balance pullies, or the connecting or disconnecting of
these shafts for shifting the power at pleasure, from one saw mill to the other
as they may be wanted to run or stop first one mill & then the other, is effected
by friction connecting boxes of the kind in common use.
I have described in this specification the several parts of an entire saw mill and
have designated from them what I claim as inventor of the improved parts con-
sisting of a newly constructed iron supporting frame, an improved pair of vi-
brating fender posts, a newly applied pair of pitmans, an improved iron saw
gate and saw index improved saw stirrups, and two pair of improved head blocks
and mill dogs for which I ask Patent for the whole, or a part of them to be
used in distinct mills, according to the manner of sawing, for which I have
contemplated their several uses, and that I do not ask a patent for those
other parts described in distinct paragraphs to the foot of the parts to which I
annexed no claim, I therefore claim not any part of them in this Specifica-
tion, except as before & hereinafter described, neither do I claim any improve-
ment in the saws themselves, or their up & down motion, nor the horizontal
movement of the carriage, except its regular advance by a double groved worm feed called the improved feeding apparatus, which I also claim as
inventor, and have set forth further improvements that I have made for the sake
of explaining those parts, which I have herein before claimed, as well as to ena-
ble persons skilled in mill building to construct and put an entire saw mill of
this new construction into useful operation, & in order that the further advantages
of these improvements may be fully understood, altho' I may have in this spe-
cification and accompanying drawings & description refering to them been par-
ticular in the explanation of the said improvements I have nevertheless calcu-
lated and do set forth that I have in view that the improved parts of this
saw mill may be of larger or smaller dimensions and the proportions be varied
to advantage from the foregoing description without materially varying the
general plan of this new and useful portable iron gang saw mill, together
with the iron saw mill frame having the advantage of being for the first time
constructed of cast iron from patterns, and fitted up as a complete machine by
which the gang saw mill can now be made in a more uniform and expedi-
tious manner than before, and hereby claiming that by the said improvements,
the gang saw mill is rendered more useful and durable by these several
improved forms of iron which being the only material that would admit of
the most advantageous construction & despatch, by patterns of so many regular
parts thus for the first time put together that would constitute an entire gang
saw mill with more accuracy, compactness, firmness, durability and despatch,
than was known before. The application of these improved iron parts to this
useful purpose of being not only removeable from place to place, but being
made of iron cast after patterns with such great despatch an accuracy; as will
avoid the great cost, delay and inconvenience of tedious and various mill
wright calculations, in erecting high, heavy and expensive timber mill buil-
dings and gearing for steam power, and which by this improved construction
renders water power in numerous places applicable that would otherwise be
useless for this purpose; thus making water mill privileges more plenty: and
which renders the gang saw mill when constructed small upon this plan
capable of the most advantageous use in countries where water privileges are
not to be found, by being propelled by small steam engines, wind or animal
power and of being removeable at little expense to be continued convenient

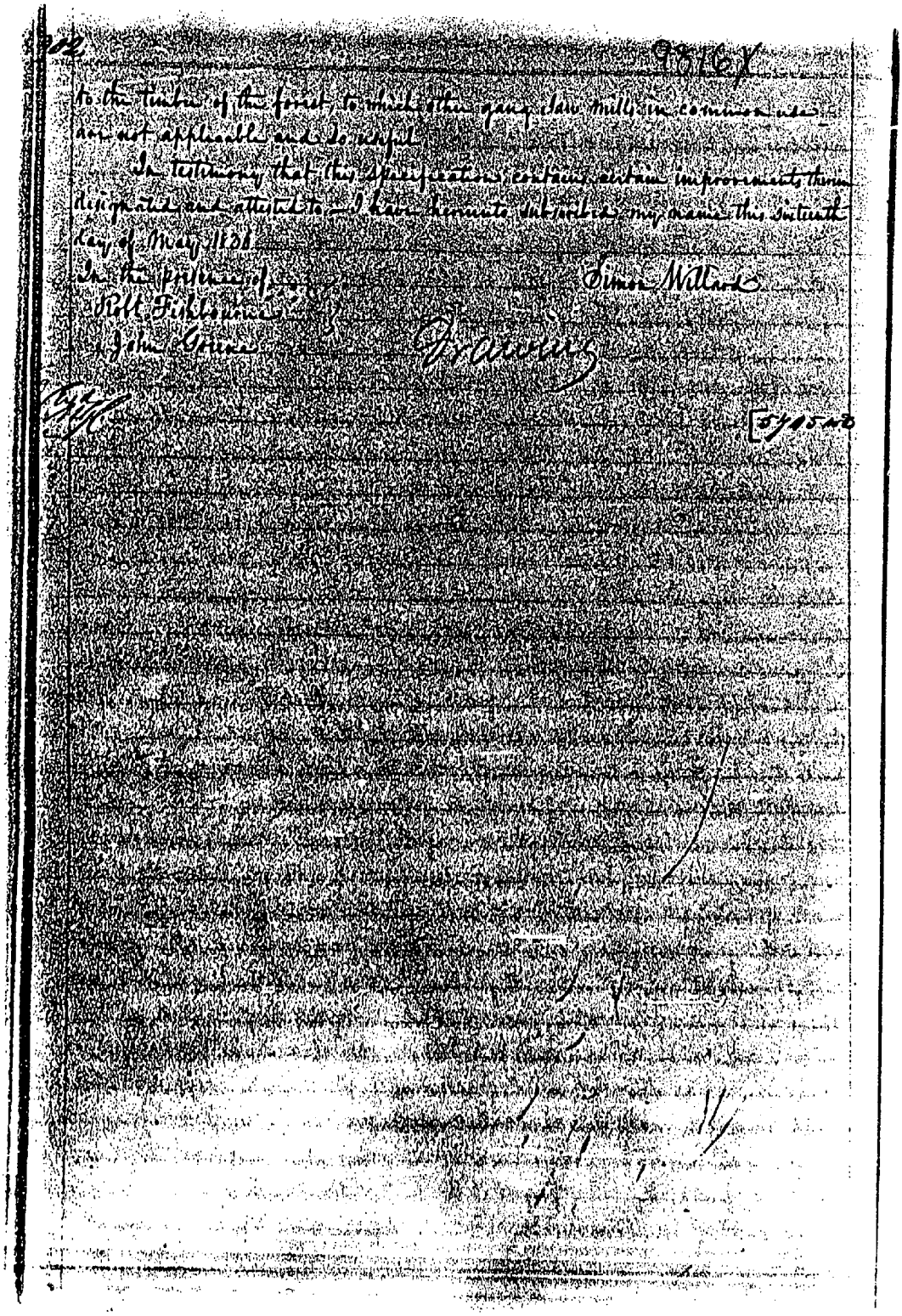

[illegible] 9816X to the timber of the forest, to which other gang saw mills in common use are not applicable and so useful.

In testimony that this specification contains certain improvements therein designated and attested to — I have hereunto subscribed my name this [illegible] day of May 1838

In the presence of
Robt. Fishbourne
John Greene

Simon Willard

Drawing

[illegible]

[5915 [illegible]